United States Patent
Ohnishi et al.

[19]
[11] Patent Number: 5,979,684
[45] Date of Patent: *Nov. 9, 1999

[54] CARGO CONTAINER

[75] Inventors: Hiroshi Ohnishi; Nobuhiko Shimizu; Masayoshi Yamagiwa, all of Iyo-gun, Japan

[73] Assignee: Toray Industries, Inc,, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/809,268

[22] PCT Filed: Jul. 12, 1996

[86] PCT No.: PCT/JP96/01941

§ 371 Date: Mar. 12, 1997

§ 102(e) Date: Mar. 12, 1997

[87] PCT Pub. No.: WO97/03898

PCT Pub. Date: Feb. 6, 1997

[30] Foreign Application Priority Data

Jul. 14, 1995 [JP] Japan .................... 7-178868
Mar. 1, 1996 [JP] Japan .................... 8-44735

[51] Int. Cl.[6] .................................................. B65D 90/02
[52] U.S. Cl. .................... 220/1.5; 220/62.22; 220/62.19; 220/592.25; 220/645
[58] Field of Search ........................... 220/1.5, 445, 454, 220/421, 453, 455, 457, 420, 464, 468, 562, 645, 62.22, 62.19, 62.11, 592.1, 592.25; 428/35.7, 36.3, 36.4, 36.5; 296/211

[56] References Cited

U.S. PATENT DOCUMENTS

| | | | |
|---|---|---|---|
| 3,319,431 | 5/1967 | Clarke et al. | 220/445 |
| 3,989,562 | 11/1976 | Hladik et al. . | |
| 4,646,499 | 3/1987 | Wilson . | |
| 5,403,062 | 4/1995 | Sjostedt et al. | 220/1.5 |
| 5,450,977 | 9/1995 | Moe | 220/1.5 |
| 5,645,184 | 7/1997 | Rowse et al. | 220/454 |
| 5,702,151 | 12/1997 | Grote et al. | 220/1.5 |

OTHER PUBLICATIONS

Translation PTO–98–1905, Mar. 1998.
Translation PTO 98–1906, Mar. 1988.

*Primary Examiner*—Stephen Castellano
*Attorney, Agent, or Firm*—Austin R. Miller

[57] ABSTRACT

A cargo container wherein at least two walls adjacent to each other are constituted using an integrally formed FRP panel, and a cargo container having a sandwich panel including a core and FRP skins as a main rigidity-maintaining member and wherein at least two walls adjacent to each other are formed integrally. The cargo container according to the present invention is light and has sufficient strength and rigidity as compared with a conventional aluminum-alloy container, and can reduce time and cost required for fabrication and production thereof. Further, the cargo container constituted using the sandwich panel including the core and the FRP skins has excellent freezing, refrigerating, cold insulating and heat insulating performances.

11 Claims, 10 Drawing Sheets

F I G. 5
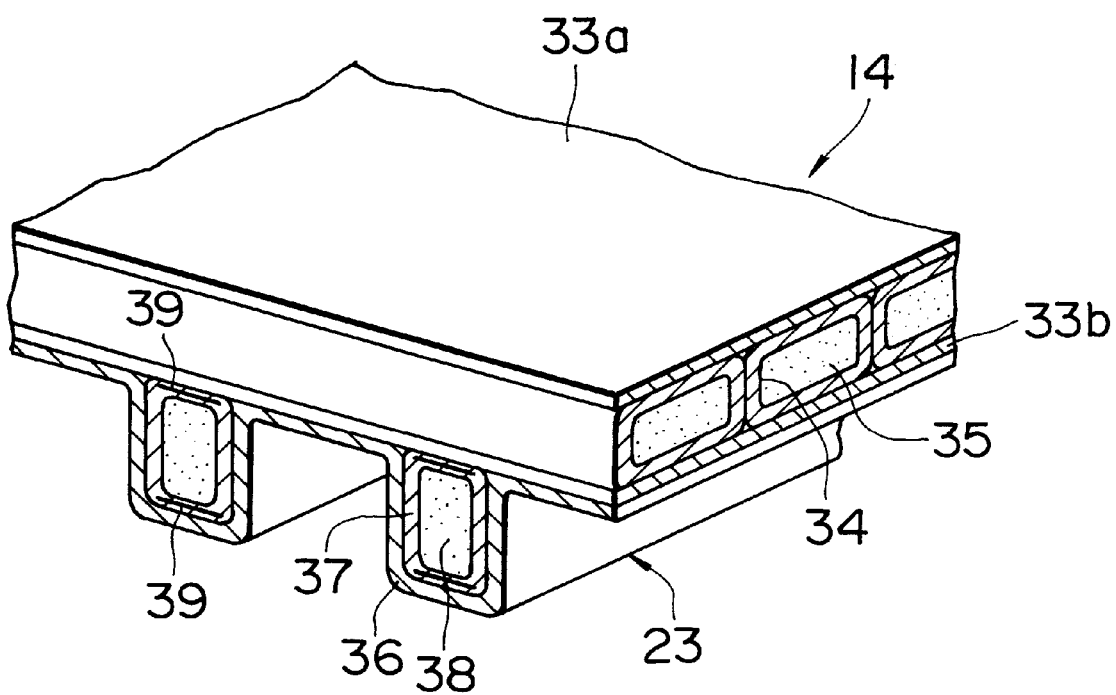

F I G. 10
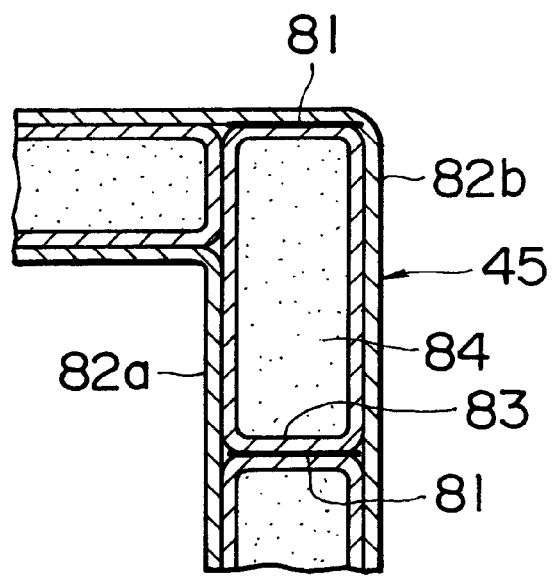
F I G. 11
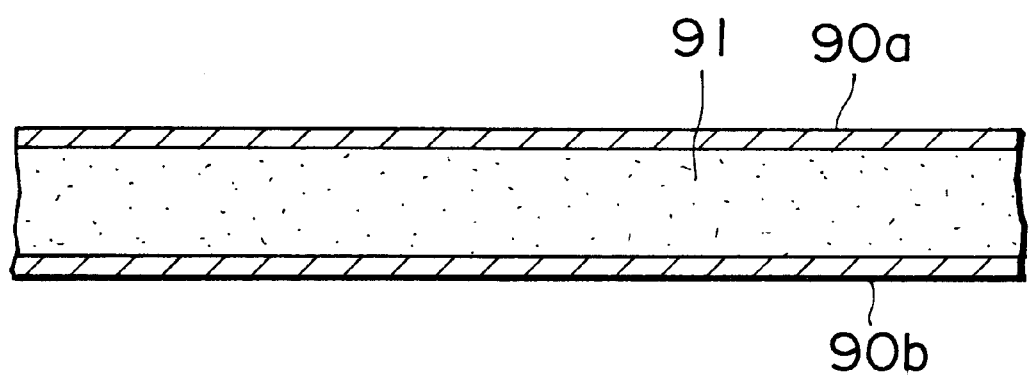

CARGO CONTAINER

TECHNICAL FIELD OF THE INVENTION

The present invention relates to a cargo container formed using FRP (fiber reinforced plastics) which is suitable as a container for freezing, refrigerating, cold insulating or heat insulating in uses such as marine containers, truck containers, train containers and air containers.

BACKGROUND ART OF THE INVENTION

For example, in a marine container for freezing, an aluminum alloy has been used for many portions of the container because the running cost can be reduced by lightening the container.

Such a marine container for freezing is indispensable to transport frozen goods and perishables. More than 100 containers are loaded on one freighter, and in a container ship, there is a case where many containers more than 1,000 are loaded, and the economical advantage due to the lightening is great. Although the tare weight of a present aluminum-alloy freezing container used as a marine container having a width of about 2.4 m, a length of about 12 m and a height of about 2.9 m is about 4 tons, further lightening such a container almost has not been performed for these ten or more years since a steel material had been changed to an aluminum-alloy material.

Most of present freezing containers are fabricated by welding a sandwich panel having aluminum-alloy skins to an aluminum-alloy frame together with a reinforcing material such as a steel gusset, thereby constructing a box structure. In the above-described marine container, it is necessary to fabricate many parts, and in such a container, not only the weight is great but also much time and cost are required for the fabrication and production.

Further, in a present freezing container, it is necessary to use upper and lower girders, corner posts and floor beams having great section moduli in order to ensure the strength and rigidity of the whole of the container, and this is one of factors obstructing to lighten the container.

As a method for solving the above-described problems in a freezing container, for example, "HIGH-PERFORMANCE Composites September/October 1995" proposes a marine freezing container wherein flanges for connection are provided around a sandwich panel having skins made from a pultruded FRP hollow material and a core made from a foam material, and sandwich panels adjacent to each other are connected by adhesion via the flange, thereby forming a box structure.

In this container, however, because large-scale upper and lower girders, corner posts and floor beams (hereinafter, also referred to as "girders etc.") are not required, the container is lightened as compared with the conventional aluminum-alloy container, but a thick sandwich panel is required to disuse the girders etc., the advantage for lightening is not sufficient. Further, because a structure for connecting panels adjacent to each other is employed, not only the airtight and heat insulating properties are poor but also much time and cost still are required for the fabrication and production.

Also in air cargo containers, there are similar problems.

An airplane has a great gloss factor among various carriages and the influence due to lightening is great even in a small lightening, and therefore, FRP has been used for many portions of a plane body.

Such an air cargo container is indispensable to transport freight and baggages of passengers. Several tens containers are loaded on one airplane, particularly, an airplane used for an international air line, and in a cargo airplane, more than 100 containers are loaded, and the economical advantage due to the lightening is great. Although the weight of a present standard air cargo container having a width of about 2 m, a depth of about 1.5 m and a height of about 1.6 m is about 90 kg, lightening such a container almost has not been performed for these twenty or more years in spite of a known condition where, if the total weight of an airplane, particularly, an airplane used for an international air line, could be reduced by 1 kg, the running cost can be can be reduced by about 100 dollars per one year.

Most of present air cargo containers are fabricated by connecting an aluminum-alloy plate to an aluminum-alloy frame together with a reinforcing material such as a gusset by rivets or welding, thereby constructing a box structure. In the above-described standard container, more than 50 parts must be assembled, and the number of rivets required for the connection is over 500. In such a container, not only the weight is great but also much time and cost are required for the fabrication and production.

Further, in a present air cargo container, it is necessary to use frames having a great section modulus in order to ensure the strength and rigidity of the whole of the container, and this is one of factors obstructing to lighten the container.

As a method for solving the above-described problems in an air cargo container, for example, JP-A-HEI 6-48480 (EP-A-520745) proposes an air cargo container wherein flanges for connection are provided around a sandwich panel having skins made from FRP and a core made from a foam material, and sandwich panels adjacent to each other are connected via the flange, thereby forming a box structure.

In this container, however, because FRP is used and large-scale frames are not required, the container is lightened as compared with the conventional aluminum-alloy container, but a thick sandwich panel is required to achieve a frameless condition, the advantage for lightening is not sufficient. Further, because a structure for connecting panels is employed, much time and cost still are required for the fabrication and production.

DISCLOSURE OF THE INVENTION

An object of the present invention is to solve the above-described problems and to provide a cargo container which is lighter, has sufficient strength and rigidity for the container and can greatly reduce the time and cost required for the fabrication and production thereof.

To accomplish this object, a cargo container according to the present invention is characterized in that at least two walls adjacent to each other are constituted using an integrally formed FRP panel.

In this cargo container, the above-described at least two walls can be formed, for example, as a floor wall and a side wall; a roof wall and a side wall; a floor wall, a side wall and a rear wall; a roof wall, a side wall and a rear wall; or a floor wall, a side wall, a rear wall and a roof wall.

Although the above-described at least two walls adjacent to each other can also be constituted using an integrally formed single FRP plate, at least a part of the at least two walls can be constituted as a sandwich structure including a core and FRP skins.

Further, the above-described at least two walls may have an FRP stiffener, a stiffener having a sandwich structure including a core and an FRP skin, or an FRP stiffener having a hollow structure. Such a stiffener can be provided at a freely selected position such as a central portion or an end portion of a wall. Further, such a stiffener may be provided, for example, at a corner portion inside of the above-described at least two walls adjacent to each other. In such a structure, because the load applied to the whole of the container is shared by the stiffener provided, it is possible to further reduce the thickness and weight of a wall and a lighter container having high strength and rigidity can be obtained.

Further, it is preferred that reinforcing fibers of the FRP panel extend over the above-described at least two walls adjacent to each other. By the structure that the reinforcing fibers extend over the at least two walls (over at least two planes), the strength and rigidity of the whole of the container formed as a structural body can be further increased, and it becomes possible to constitute the container using a thinner FRP panel, thereby obtaining a great advantage for lightening.

Further, a cargo container according to the present invention is characterized in that the cargo container has a sandwich panel including a core and FRP skins as a main rigidity-maintaining member and at least two walls adjacent to each other are formed integrally.

In this cargo container, the above-described at least two walls can be formed, for example, as a floor wall and a side wall; a roof wall and a side wall; a floor wall, a side wall and a rear wall; a roof wall, a side wall and a rear wall; or a floor wall, a side wall, a rear wall and a roof wall.

Further, the above-described at least two walls may have an FRP stiffener, a stiffener having a sandwich structure including a core and an FRP skin, or an FRP stiffener having a hollow structure. In such a structure, because the load applied to the whole of the container is shared by the stiffener provided, it is possible to further reduce the thickness and weight of a wall and a lighter container having high strength and rigidity can be obtained.

It is preferred that reinforcing fibers of the FRP skins extend over the above-described at least two walls adjacent to each other. By the structure that the reinforcing fibers extend over the at least two walls (over at least two planes), the strength and rigidity of the at least two walls adjacent to each other can be further increased structurally, the strength and rigidity of the whole of the container can be further increased, and it becomes possible to constitute the container using a thinner FRP panel, thereby obtaining a great advantage for lightening.

In such a container constituted using a sandwich panel, further an FRP girder may be provided in the panel or on an outer surface of the panel. By adding such a girder, the strength and rigidity of the panel itself increase as well as the strength and rigidity of the whole of the container increase. Further, the container can be constituted using a thinner sandwich panel by the increase of the strength and rigidity of the panel, thereby obtaining a great advantage for lightening.

In such an FRP girder, it is preferred that reinforcing fibers extend in the longitudinal direction of the girder. By this structure, the strength and rigidity of the FRP girder itself in the longitudinal direction thereof can be ensured, and the above-described excellent advantages can be obtained by addition of the FRP girder.

Further, in the sandwich panel including a core and FRP skins, it is preferred that FRP skins facing each other are connected by a web. By such a connection by the web, the FRP skins facing each other can be reinforced, and the strength and rigidity of the sandwich panel increase. Therefore, the container can be constituted using a thinner sandwich panel, thereby obtaining a greater advantage for lightening.

Furthermore, in the cargo container according to the present invention, a beam may be provided on a back surface of a floor wall. This beam also can be formed as a sandwich structure including a core and an FRP skin. By addition of such a beam, particularly the floor of the container is reinforced, and ultimately, the reinforcement of the whole of the container is possible.

The above-described cargo container can be used as a container for ships, trucks, trains, airplanes etc. In particular, the container constituted using a sandwich panel is useful as a container for freezing, refrigerating, cold insulating and heat insulating.

BRIEF EXPLANATION OF THE DRAWING

FIG. 5 is an enlarged partial perspective view of a floor wall portion of the container shown in FIG. 2.

FIG. 10 is an enlarged, partial, vertical sectional view of a corner portion between panels of the container shown in FIG. 6.

FIG. 11 is a partial sectional view of a sandwich panel portion according to the present invention, showing another embodiment in structure.

THE BEST MODE FOR CARRYING OUT THE INVENTION

In the present invention, as a method for constituting at least two walls adjacent to each other by an integrally formed FRP panel or a method for forming at least two walls adjacent to each other integrally by a sandwich panel including a core and FRP skins, any method may be employed among an autoclave molding after placing unidirectional prepregs or a woven-fabric prepreg of reinforcing fibers in a mold, a RTM method (resin transfer molding) or a hand-lay-up method using a preform of reinforcing fibers, a drawing method and other general FRP forming methods.

Desirably, it is preferred to apply the RTM method or a resin infusion molding easy in integrally forming. As the resin infusion molding, for example, methods disclosed in U.S. Pat. Nos. 4,902,215, 5,052,906, 5,316,462 and 5,439,635 can be applied.

Figure 1:
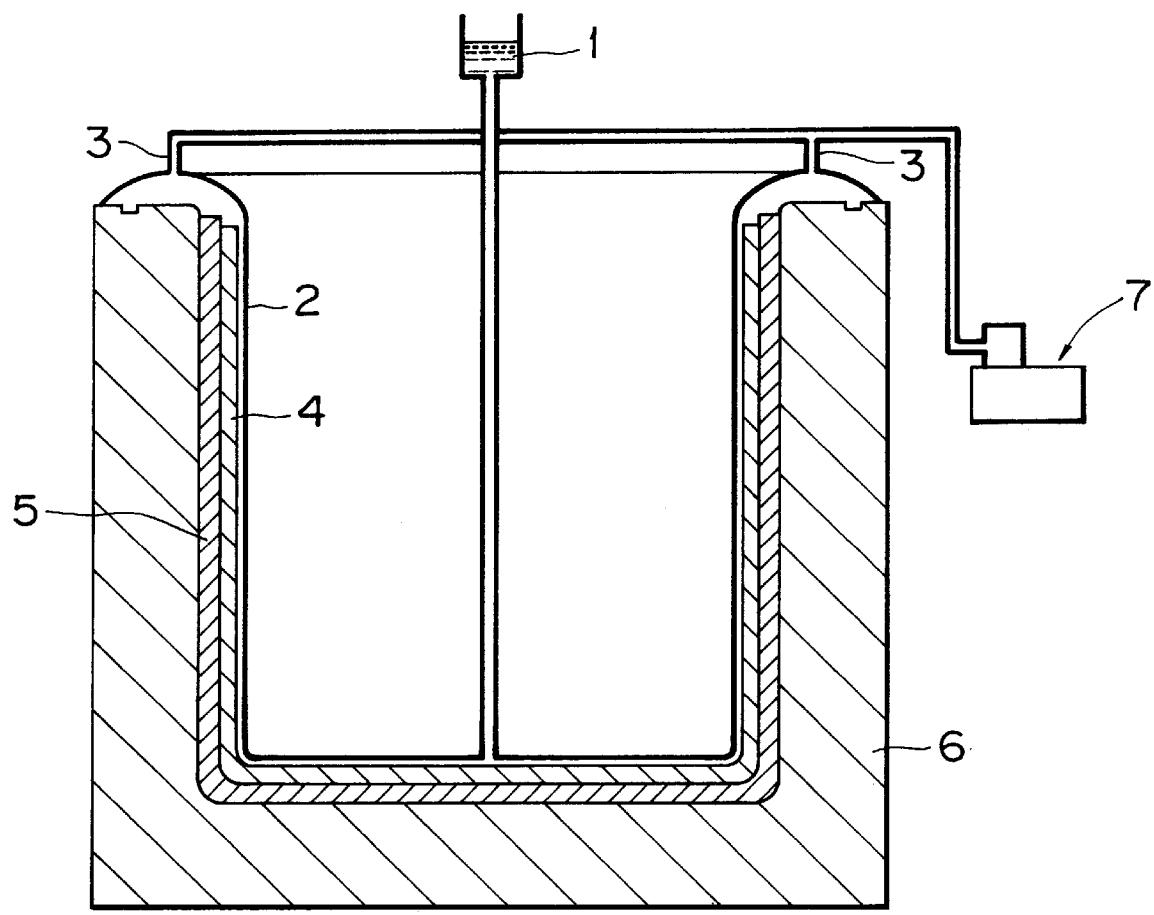
FIG. 1 is a schematic view showing an example of a method for integrally forming a panel for a cargo container according to the present invention.

The method described in each of these U.S. patents is one of resin infusion methods, and is a method capable of producing a large FRP structural body having a high fiber volume content by integrally forming in a short period of time. FIG. 1 is a schematic view showing a forming state described in U.S. Pat. No. 5,439,635. In FIG. 1, label 1 indicates a resin, label 2 indicates a vacuum bag having suction ports 3, label 4 indicates a resin distributing material comprising a material such as a mesh sheet or a sheet disposed with resin paths in a grating form, label 5 indicates a fiber substrate, label 6 indicates a mold and label 7 indicates a vacuum pump, respectively. The resin 1 rapidly extends over the entire planes of the resin distributing material 4 under a pressure-reduced condition due to the vacuum pump 7 before being impregnated into the fiber substrate 5. The extended resin 1 is then impregnated into the fiber substrate 5 in the thickness direction thereof, and because the distance in the thickness direction is small, the resin is impregnated in a short period of time. Therefore, the speed of the resin impregnation is greatly increased as compared with a usual resin infusion molding in which the resin distributing material 4 is not used, and this method is suitable particularly for forming a large-scale structural body.

If this forming method is employed, even in a case of the aforementioned marine cargo container or air cargo container having a large standard size, at least two walls adjacent to each other can be integrally and simultaneously formed easily using FRP.

For parts such as a plate and a door frame other than the continuous FRP formed integrally and simultaneously for constituting a container, a conventional metal material such as an aluminum alloy or a steel, an FRP material formed separately, or other freely selected materials can be used. It is preferred to use a material light and excellent in specific strength and specific elastic modulus, and in a case of a metal material, an aluminum-alloy material is preferred, and in a case other than a metal material, an FRP material is preferred.

Further, the continuous FRP formed integrally and simultaneously and other parts can be connected by direct connection by rivets or an adhesive, or by connection via a reinforcement member such as a gusset or a frame by rivets, welding or an adhesive.

In the at least two walls adjacent to each other which are integrally formed, although it is possible to constitute the main rigidity-maintaining member from an FRP single plate, when it is formed as a sandwich panel including a core and FRP skins, an advantage for lightening can be obtained while the strength and rigidity of the whole of the container can be further increased.

It is preferred to use a light material excellent in heat insulating property as the core material of the sandwich panel, for example, a synthetic resin foam is preferred. As such a synthetic resin foam, for example, a thermoplastic resin foam such as a polyethylene, a polypropylene, a polyvinyl chloride, polystyrene or an ABS resin and a thermosetting resin foam such as a phenol, an epoxy, a silicone or polyurethane can be used. Further, as the core material, for example, an aluminum honeycomb material and an metha-system aramide fiber paper honeycomb material can be used.

In such a case, it is preferred to use a foam having a thermal conductivity of not more than 150 J/m·hr·° C., and particularly, if a foam having a thermal conductivity of not more than 80 J/m·hr·° C. is used, a great heat insulating advantage can be obtained. As the result of the excellent heat insulating performance, the electric variable required for a freezer etc. can be saved as well as the capacity can be increased by enlarging the inner size particularly by thinning a side wall.

Further, when a sandwich panel including such a foam having a low thermal conductivity as the core is used as a main rigidity-maintaining member, the heat insulating performance of the whole of the container can be remarkably increased. For example, a cargo container having a thermal leakage of not more than $1.5 \times 10^5$ J/hr·° C. can be easily designed, and even a cargo container having a thermal leakage of not more than $0.5 \times 10^5$ J/hr·° C. can be designed. Where, the thermal leakage can be determined by the method described in TC/104 of ISO container standard.

The density of the foam core material is preferably not more than 50 kg/m$^3$ particularly from the viewpoint of lightening, and further, greater advantage for lightening can be obtained by using a foam having a density of not more than 40 kg/m$^3$. Further, in addition to the advantage for lightening, an excellent heat insulating property also can be obtained.

Further, preferably the foam core material is flame-proof finished or at least has a self-extinguishing property.

Furthermore, even in a case where a main portion of a wall is constituted from an FRP single plate, in order to obtain a container light and having high strength and rigidity and an excellent heat insulating performance, a part of the respective FRP walls can be formed as a sandwich-structure portion including a core and FRP skins as described above.

By providing this sandwich-structure portion on an outer corner portion of a wall, preferably, by providing it on an outer boundary portion between walls adjacent to each other, because the load applied to the whole of the container is shared by the sandwich-structure portion, the wall can be formed thinner, thereby obtaining a lighter container having high strength and rigidity.

In the present invention, when a sandwich panel including a core and FRP skins disposed on both sides of the core is formed, although continuous FRP skins formed integrally and simultaneously and a core material may be connected by using an adhesive etc. after the molding of the FRP skins, it is preferred that the sandwich panel is formed simultaneously with the molding of the FRP skins because the post processing and the time for fabrication can be saved. In this case, although the inner skin may be formed from any material, it is preferred that the inner skin is formed from a material similar to an FRP skin which is provided as the outer skin and formed integrally and simultaneously in consideration of the adhesive property and the coefficient of thermal expansion. Further, in the present invention, a wall formed from FRP may be formed by stacking a plurality of the above-described sandwich panels.

The kind of reinforcing fibers in FRP is not particularly restricted, and high strength/high elastic modulus fibers such as carbon fibers, glass fibers and polyaramide fibers can be used. Particularly, because the FRP skin is required to be thin and light while to be provided with high strength and high elastic modulus, it is preferred that at least one of carbon fibers and glass fibers are included. Among these, carbon fibers more excellent in specific strength and specific elastic modulus are preferred. In particular, when carbon fibers having a tensile strength of not less than 3 GPa and an elongation of not less than 1.3%, an impact penetration resistance similar to that in an aluminum-alloy plate used in a conventional container can be obtained. More preferably, carbon fibers having a tensile strength of not less than 4.5 GPa and an elongation of not less than 1.7% are employed.

The formation of reinforcing fibers is not particularly restricted, and sheets of reinforcing fibers each formed by arranging the fibers unidirectionally and in parallel to each other may be, for example, stacked at predetermined angles and a matrix resin may be impregnated thereinto, or a woven fabric of reinforcing fibers may be used. Particularly, when a woven fabric of reinforcing fibers is used, the productivity is good, and an FRP can have high strength and high elastic modulus, and further, a high impact penetration resistance can be obtained. For example, if an FRP plate or an FRP skin is formed using a woven fabric of the above-described carbon fibers having a tensile strength of not less than 4.5 GPa and an elongation of not less than 1.7%, when the thickness thereof is referred to as "t", the specific maximum load against penetration becomes 10 t(N) or more.

Where, the specific maximum load against penetration is determined using an impact tester by fixing an FRP plate of 100×150 mm on a supporting base having an opening of 75×125 mm at a central portion of the base while positioning the FRP plate on the opening, thereafter naturally dropping a semispherical steel probe having a diameter of 12.7 mm and a weight of 12 kg down to a central portion of the FRP plate from a position with a height of 300 mm, and determining the specific maximum load against penetration as an impact absorbing load obtained in the dropping.

Further, as the matrix resin for the FRP, for example, a thermosetting resin such as an epoxy resin, an unsaturated polyester resin, a vinyl ester resin or a phenol resin or a thermoplastic resin such as a nylon resin or an ABS resin can be used. When a counterplan against fire is considered, it is preferred to use a resin flame-proof finished by adding a flame retardant as the matrix resin. As such a flame retardant, for example, aluminum hydride or a halogen containing compound can be used. Further, in a case where the freight is a perishable, it is preferred to use a material provided with an antibacterial/mildewproof property, for example, by adding an antibacterial/mildewproof agent particularly to the matrix resin of an inside FRP portion. As such an antibacterial/mildew proof agent, for example, a polymer prepared by reacting silver zeolite, chlorohexydine and an acrylic ester based resin can be used. Furthermore, in the cargo container according to the present invention, as needed, a lining material, for example, a lining material of a stainless steel sheet, may be provided.

In the cargo container according to the present invention, when a sandwich panel including a core and FRP skins is used as the main rigidity-maintaining member, it is preferred that the flexural stiffness of the wall is at least $1.5 \times 10^4$ N·m². By this condition, the aimed strength and rigidity of the container can be ensured.

Further, it is preferred that the cargo container has a deflection as small as possible from the viewpoint of handling. For example, it is preferred that the deflection determined when simply supported at longitudinal end portions with a supporting span "s" is not more than s/200.

Furthermore, because it is considered that a tip of a fork lift may come into contact with a wall of a cargo container or various impact forces such as one caused by dropping of metal parts may be applied to the wall, preferably the wall is designed so as to resist such a force. For example, it is preferred that the impact absorbing energy of a wall is at least 80 J, and it is more preferably not less than 150 J, further more preferably not less than 200 J.

Where, the impact absorbing energy is determined using an impact tester by fixing a sandwich panel of 600×600 mm on a supporting base having an opening of 500×500 mm at a central portion of the base while positioning the panel on the opening, thereafter naturally dropping a plate-like steel probe having a shape similar to that of a tip of a fork of a fork lift and having a width of the tip of 100 mm and a weight of 10 kg down to a central portion of the panel from a position with a height of 2 m, and determining as an impact absorbing energy under such a condition.

Hereinafter, concrete examples of the cargo container according to the present invention will be explained with reference to the drawings.

Figure 2:
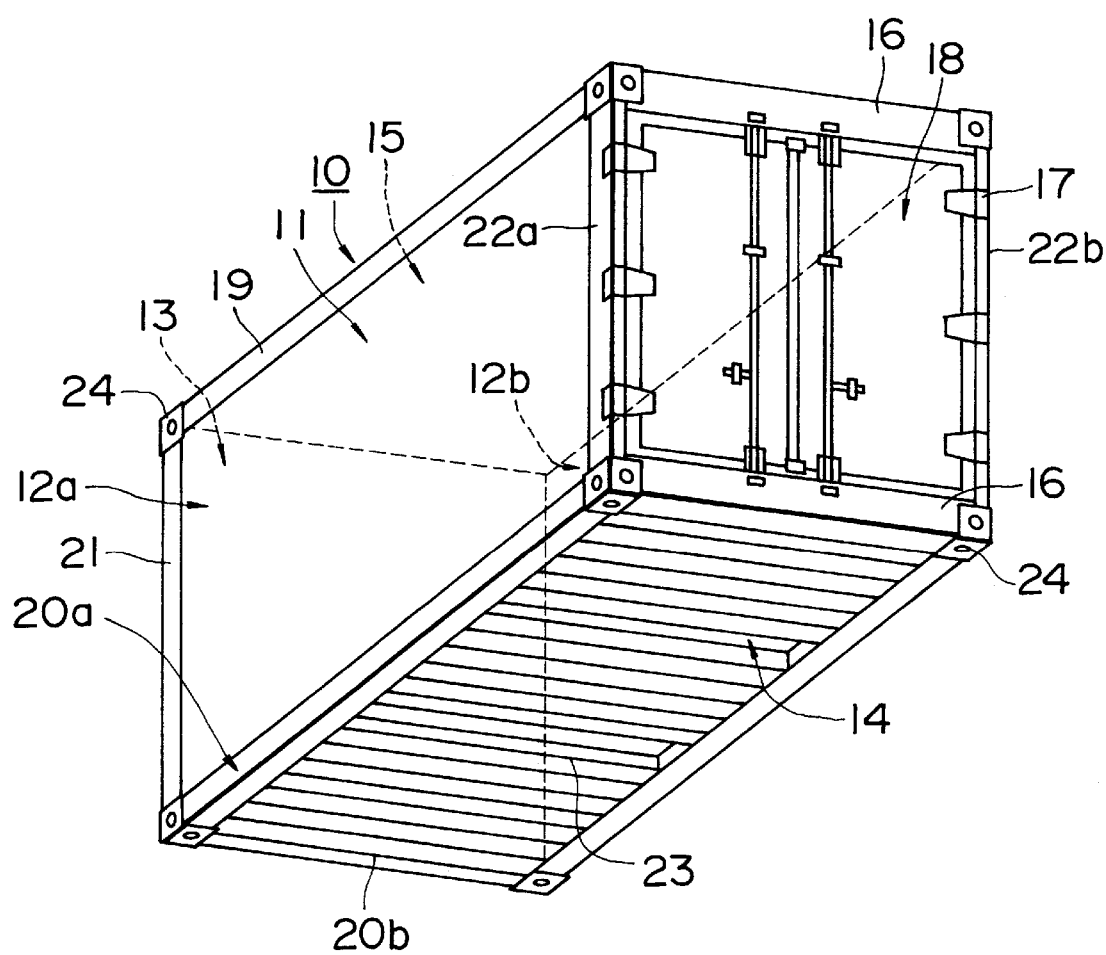
FIG. 2 is a perspective view of a cargo container according to an embodiment of the present invention.

FIG. 2 is a schematic perspective view of a marine refrigerated container according to an embodiment of the present invention. In FIG. 2, a panel member 11 is constituted as a continuous FRP panel member forming both side walls 12a and 12b, a rear wall 13 and a floor wall 14 integrally and simultaneously. An FRP roof wall 15 is provided at the ceiling portion of this panel 11, an FRP frame 16 for attaching a door is provided at the front side thereof, and an FRP door 18 is attached to the frame 16 via steel door hinges 17. The door hinges 17 are insertion molded with the frame 16 and the door 18, respectively. FRP girders 19 are provided on the connecting portions between the above-described integrally formed panel member 11 and the roof wall 15, and FRP girders 20a and 20b are formed integrally with the panel member 11 at the connecting portions between the side walls 12a and 12b and the floor wall 14 and between the floor wall 14 and the rear wall 13, respectively. Although steel corner posts are stood on the four corners of the floor wall 14, among these, a corner posts 21 positioned between the side walls 12a and 12b and the rear wall 13 are formed integrally with the panel member 11. Corner posts 22a and 22b on the front side may be formed integrally with the panel member 11, or they may be formed as separate members, for example, may be formed integrally with the FRP frame 16 for attachment of the door. A plurality of FRP beams 23 extending parallel to each other are provided on the back surface of the floor wall 14. Further, in this embodiment, steel corner fittings 24 are attached to the respective corner portions of the container. Thus, a marine refrigerated container 10 is constituted.

Figure 3:
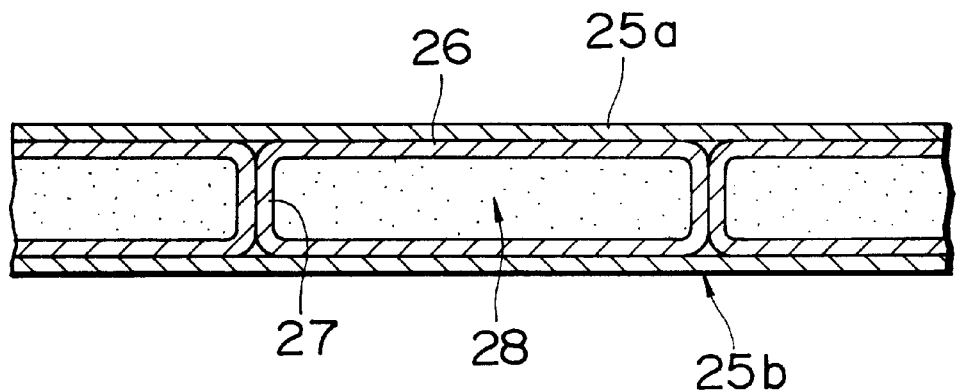
FIG. 3 is an enlarged partial sectional view of a sandwich panel portion of the container shown in FIG. 2.

The cargo container 10 has a sandwich panel including a core and FRP skins, and particularly, the integrally formed panel member 11 has this sandwich structure and at least two walls adjacent to each other are formed integrally. FIG. 3 shows a schematic vertical section of a sandwich panel according to the present invention. In FIG. 3, labels 25a and 25b indicate FRP skins. Webs 27 connecting the FRP skins 25a and 25b are formed between both FRP skins 25a and 25b by disposing FRP members 26 each having a box-shaped cross section at a condition contacted to each other. A core 28 made from a polyurethane foam is disposed in each web forming FRP member. The sandwich panel, particularly, both FRP skins 25a and 25b are reinforced by the webs 27 connecting the FRP skins 25a and 25b. This web forming FRP member 26 may be formed as I-shape, C-shape or Z-shape in cross section, as described later. Further, the web forming FRP members 26 may be disposed with a space therebetween and a core 28 can be disposed between the spaced FRP members 26, and further, in such a structure, the FRP members 26 can be formed as members having a hollow structure.

In the forming of such a sandwich panel, although the sandwich panel can be formed by forming the FRP skins 25a and 25b extending over at least two walls, thereafter disposing the FRP members 26 and cores 28 between the FRP skins 25a and 25b and connecting them integrally, these members also can be integrally formed substantially simultaneously, and the latter method is more suitable for a more efficient forming in a short period of time.

Figure 4:
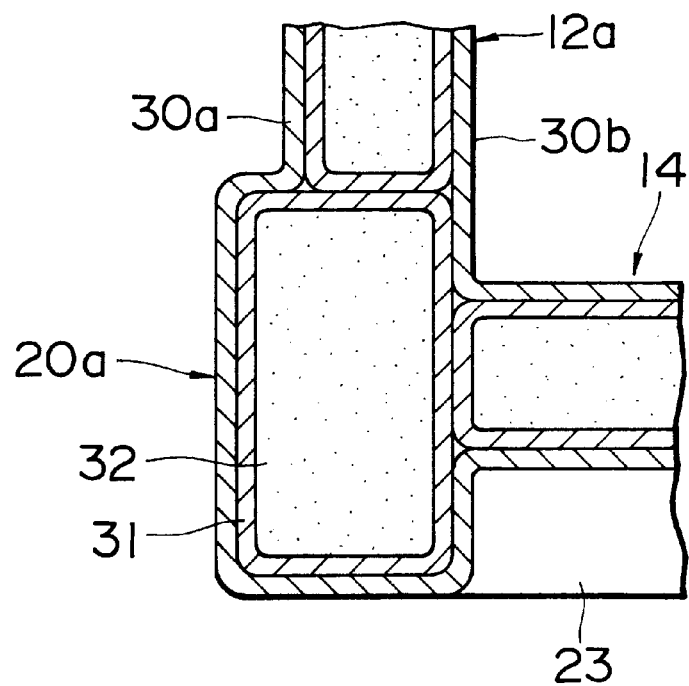
FIG. 4 is an enlarged partial sectional view of a girder portion of the container shown in FIG. 2.

FIG. 4 shows a section of a girder portion of the container 10 shown in FIG. 2, particularly a portion of the lower girder 20a. In this embodiment, a girder forming FRP member 31 is integrally formed between FRP skins 30a and 30b for constituting a sandwich panel of the integrally formed member 11, and a core 32 is disposed in the FRP member 31. In the girder 20a thus formed, it is preferred that the reinforcing fibers of the girder forming FRP member 31 extend in the longitudinal direction of the girder from the viewpoint of strength. Other girders and corner posts have a similar structure.

FIG. 5 shows a sandwich panel structure of the FRP floor wall 14 having the FRP beams 23 on its back surface in the container 10 shown in FIG. 2. In FIG. 5, labels 33a and 33b indicate FRP skins, label 34 indicates an FRP web and label 35 indicates a core. The FRP beams 23 are provided on the back surface of the floor wall 14 comprising this sandwich panel. In this embodiment, the beam 23 is formed from an FRP skin 36, a box-shaped FRP member 37 and a core 38, and it is formed as a sandwich structure including the FRP skin 36 and the core 38. Further, carbon fibers for reinforcement 39 are disposed in the upper and lower portions of the FRP member 37.

In the cargo container 10 thus constituted, a great lightening is possible as compared with a conventional aluminum-alloy cargo container. For example, in a structure wherein both side walls 12a and 12b, rear wall 13 and floor wall 14 are formed integrally and simultaneously and glass fibers are used as reinforcing fibers to form the integrally formed panel member 11, roof wall 15, door frame 16 and door 18 are formed from FRP, upper girder 19, lower girders 20a and 20b and beams 23 provided on the back surface of the floor wall 14 are formed from a hybrid FRP of CF (carbon fibers)/GF (glass fibers), and the corner posts are formed from a steel, the rate for lightening reaches about 15%. Further, the number of parts for constituting a similar container can be reduced down to about 1/10 of that in a conventional container, and the time required for the fabrication and production thereof also can be greatly reduced down to not more than 1/4 of that for a conventional container.

Figure 6:
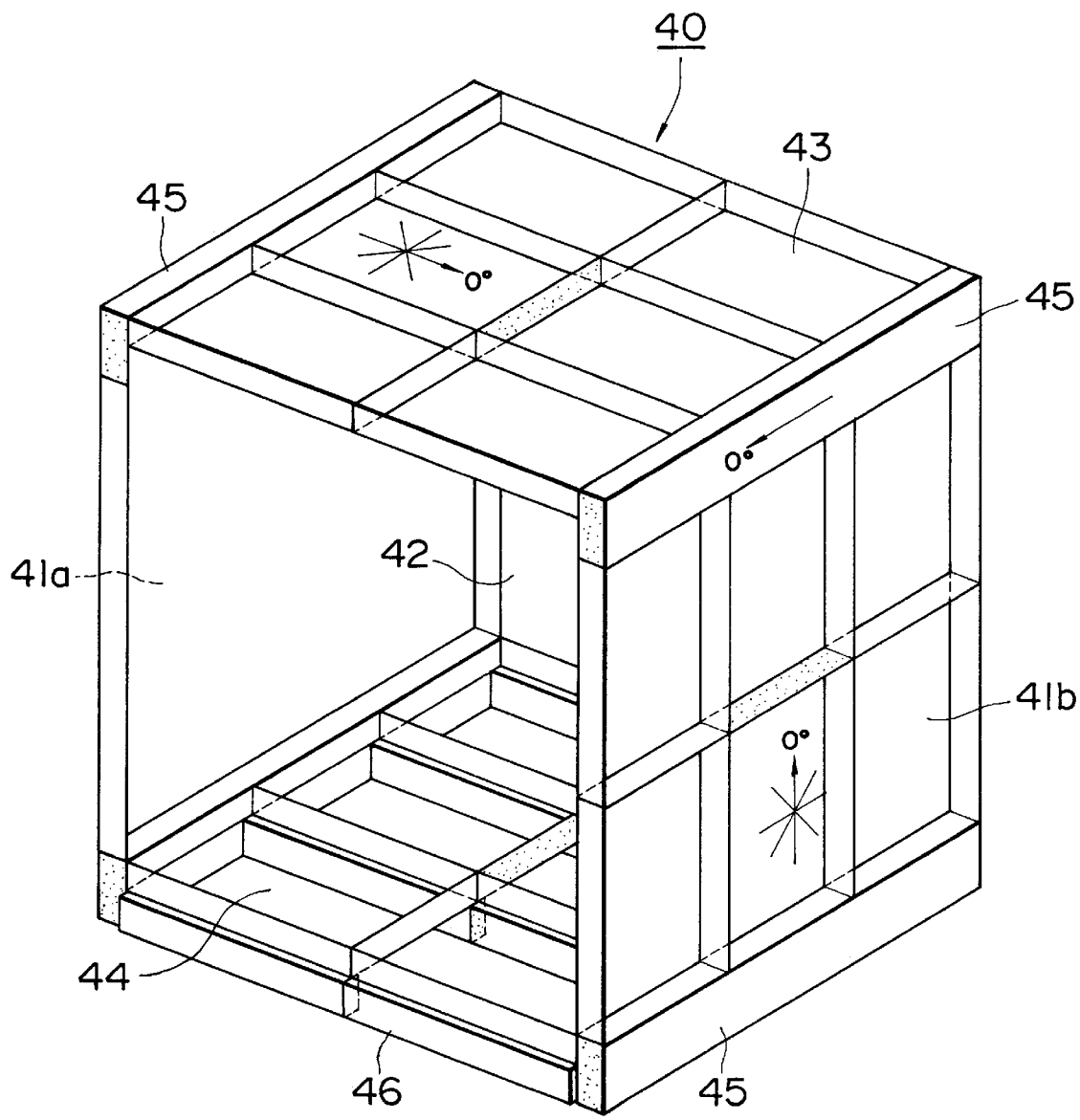
FIG. 6 is a perspective view of a cargo container according to another embodiment of the present invention.

FIG. 6 is a perspective view of a container according to another embodiment of the present invention. Container 40 has side walls 41a and 41b on both sides, a rear wall 42, a roof wall 43 and a floor wall 44, and a door portion on the front side is omitted to be shown. Each wall is formed as a sandwich panel including a core and FRP skins, and at least two walls adjacent to each other are formed integrally. Girders 45 having a similar sandwich structure are provided on the respective connecting portion between walls, and beams 46 having a sandwich structure are provided on the back surface of the floor wall 44. The indication of angle in FIG. 6 shows a 0° direction of reinforcing fibers in each portion.

Figure 7:
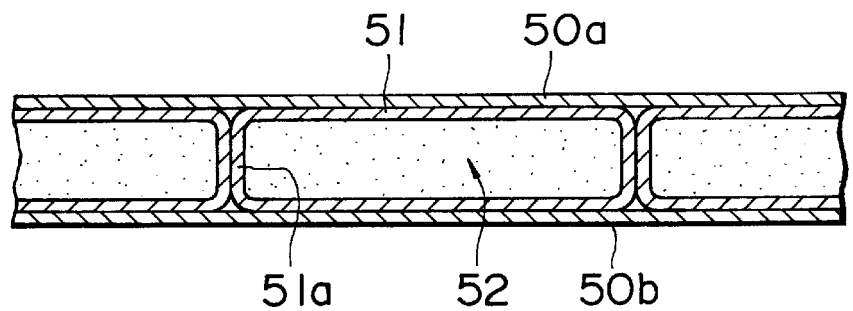
FIG. 7 is an enlarged partial sectional view of a sandwich panel portion of the container shown in FIG. 6.

FIG. 7 shows a section of the side walls 41a and 41b and rear wall 42. Labels 50a and 50b indicate FRP skins, and the formation of the reinforcing fibers thereof is constituted by stacking unidirectional woven fabrics of glass fibers in a direction of 0°±5°, a direction of 90°±5° and directions of ±45°±5° and stitching them in the thickness direction. Web forming FRP members 51 each having a box-shaped cross section are disposed between both skins 50a and 50b so as to be contacted to each other, and webs 51a connecting both FRP skins 50a and 50b are formed by the members 51. A core formed from a polyurethane foam is disposed in each web forming FRP member 51. Webs 51a reinforce the sandwich panel, particularly, the skins 50a and 50b. The web forming FRP member 51 may be formed as I-shape, C-shape or Z-shape in cross section, as described later. Further, the web forming FRP members 51 may be disposed with a space therebetween and a core 52 can be disposed between the spaced FRP members 51, and further, the members 51 can be formed as members having a hollow structure.

Figure 8:
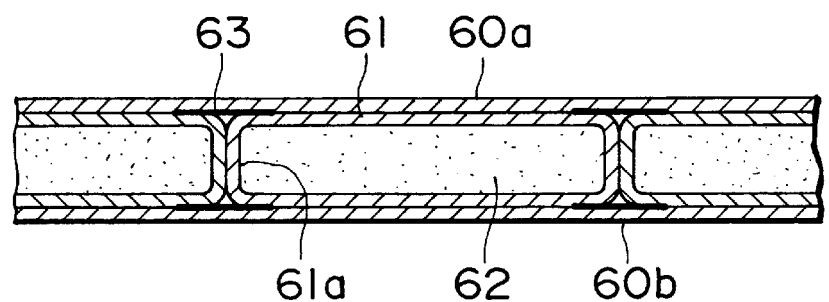
FIG. 8 is an enlarged partial sectional view of another sandwich panel portion of the container shown in FIG. 6.

FIG. 8 shows a section of the roof wall 43 shown in FIG. 6,5 labels 60a and 60b indicate FRP skins, and the formation of the reinforcing fibers thereof is constituted by stacking unidirectional woven fabrics of glass fibers in a direction of 0 °±5°, a direction of 90°±5° and directions of ±45°±5° and stitching them in the thickness direction. Web forming FRP members 61 each having a box-shaped cross section are disposed between both skins 60a and 60b so as to be contacted to each other and so as to form webs 61a connecting both skins 60a and 60b, and cores 62 formed from a polyurethane foam are disposed in the respective members 61. Further, CFRP formed using carbon fibers as reinforcing fibers for increasing the stiffness is disposed at the connecting portion between web forming FRP members 61 and at a portion between the member 61 and skin 60a or 60b, and the formation of the fibers is one formed by arranging a unidirectional woven fabric of carbon fibers 63 in a direction of 0°±5°, that is, in the longitudinal direction of the member 61.

Figure 9:
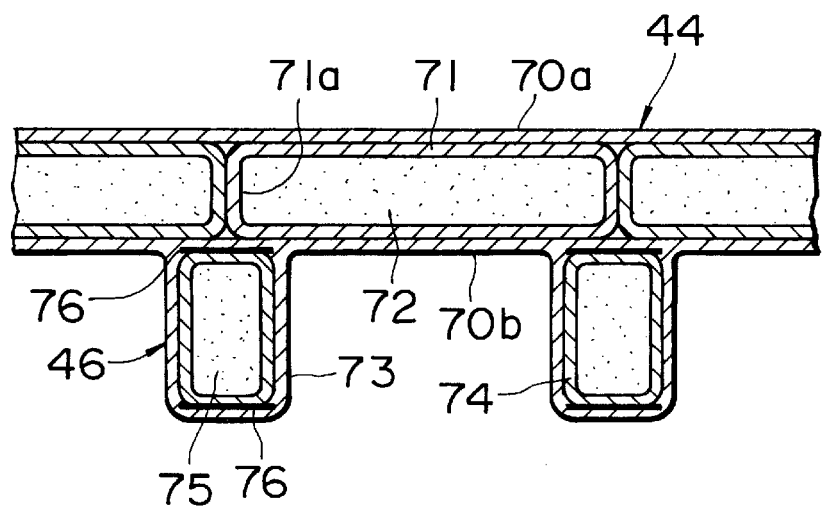
FIG. 9 is an enlarged, partial, vertical sectional view of a floor wall portion of the container shown in FIG. 6.

FIG. 9 shows a structure of a portion of the floor wall 44, and shows a structure wherein the floor wall 44 and the beams 46 provided on the back surface of the wall are integrally formed. Labels 70a and 70b indicate FRP skins, web forming FRP members 71 each having a box-shaped cross section are disposed between both skins 70a and 70b so as to be contacted to each other and so as to form webs 71a connecting both skins 70a and 70b, and cores 72 formed from a polyurethane foam are disposed in the respective members 71. The lower skin 70b and an FRP skin 73 of each beam 46 are formed integrally, an FRP member 74 having a box-shaped cross section is disposed in the skin 73, and a core 75 formed from a polyurethane foam is disposed therein. Unidirectional woven fabrics of carbon fibers 76 for reinforcement are disposed on the upper and lower surfaces of the FRP member 74 in a direction of 0°±5°, that is, in the longitudinal direction of the beam 46.

FIG. 10 shows a section of a corner portion wherein girder 45 and roof wall 43 and side wall 41a and/or 41b, and/or rear wall 42 shown in FIG. 6 are integrally formed. CFRPS are disposed on the upper and lower portions of this girder, and the formation of reinforcing fibers 81 thereof is formed by stacking unidirectional woven fabrics of carbon fibers in a direction of 0°±5°, that is, in the longitudinal direction of the girder. Where, the reinforcing fibers 81 may be formed in a formation arranging unidirectional rovings in a direction of 0°±5°, and the CFRP including the reinforcing fibers 81 may be a cured plate or a rod material of CFRP formed by pultrusion. Labels 82a and 82b indicate FRP skins, label 83 indicates a girder forming FRP member having a box-shaped cross section, and label 84 indicates a core made from a polyurethane foam, respectively. The reinforcing fibers of the girder forming FRP member 83 preferably extend in a direction of 0°±5°, that is, in the longitudinal direction of the girder.

In the cargo container 40 thus constituted, in a case of a sandwich panel formed from FRP skins formed using glass fibers as reinforcing fibers and each having a thickness of 1.2 mm and a core of polyurethane foam having a thickness of 50 mm, an impact absorbing energy of 240 J, which is about three times that of a conventional sandwich panel formed using aluminum-alloy skins having the same thickness, is indicated, and thus, the impact penetration resistance can be greatly increased. Further, while the strength and rigidity can be ensured, a great lightening can be achieved.

Although web forming FRP members each having a box-shaped cross section are disposed between both FRP skins of the sandwich panel in the containers shown in FIGS. 2 and 6, as shown in FIG. 11, it is possible to form a structure wherein a core 91 is merely disposed between both FRP skins 90a and 90b. Particularly, in a portion applied with a small load, lightening can be further accelerated by employing such a simple structure.

Figure 12:
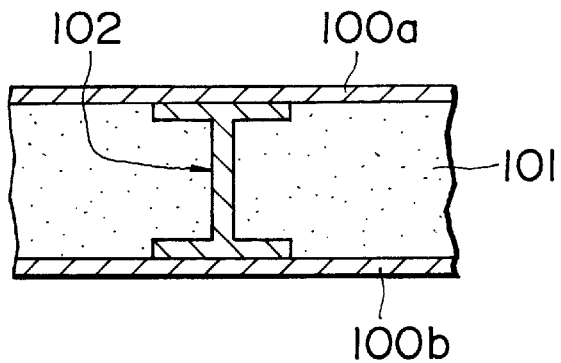
FIG. 12 is a partial sectional view of a sandwich panel portion according to the present invention, showing a further embodiment in structure.
Figure 13:
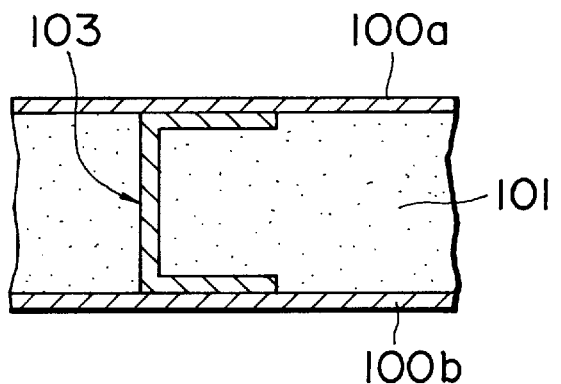
FIG. 13 is a partial sectional view of a sandwich panel portion according to the present invention, showing a still further embodiment in structure.
Figure 14:
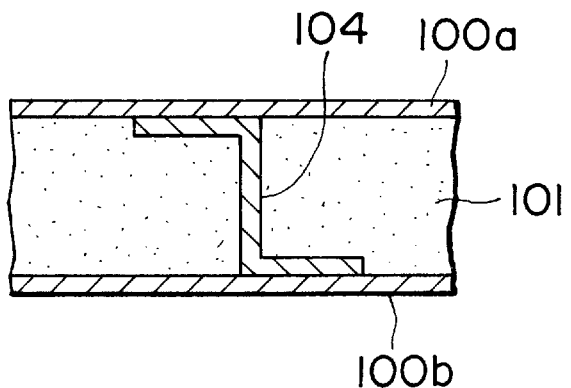
FIG. 14 is a partial sectional view of a sandwich panel portion according to the present invention, showing a still further embodiment in structure.

Further, as shown in FIG. 12, as a web forming FRP member connecting both FRP skins 100a and 100b of a sandwich panel including the FRP skins 100a and 100b and a core 101, an I-shaped member 102 can be used. Further, a C-shaped member 103 as shown in FIG. 13 and a Z-shaped member 104 as shown in FIG. 14 also can be used.

Figure 15:
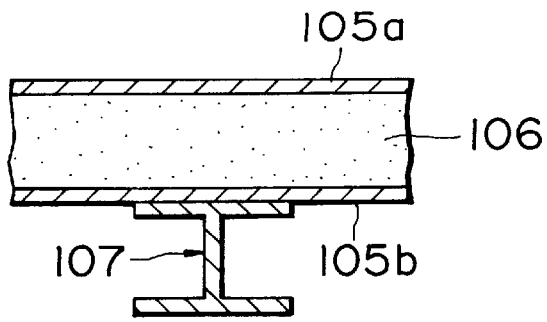
FIG. 15 is a partial sectional view of a floor wall portion of a container according to the present invention, showing another embodiment in structure.
Figure 16:
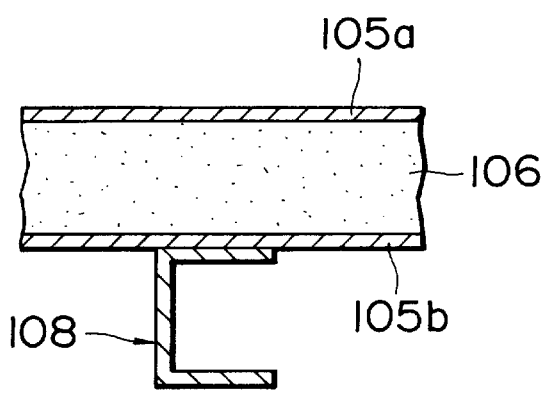
FIG. 16 is a partial sectional view of a floor wall portion of a container according to the present invention, showing a further embodiment in structure.
Figure 17:
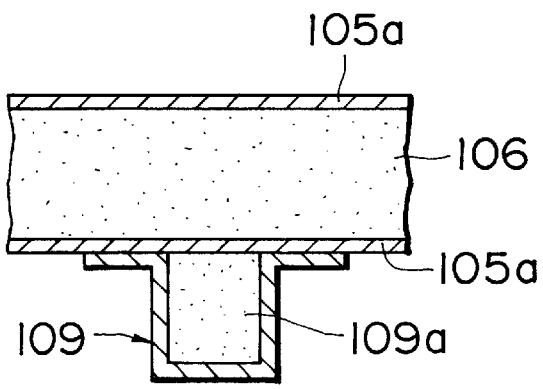
FIG. 17 is a partial sectional view of a floor wall portion of a container according to the present invention, showing a still further embodiment in structure.

Furthermore, in the cargo container according to the present invention, an FRP stiffener may be provided on an FRP plate, on the outer or inner surface of a sandwich panel including FRP skins and a core, and on a corner portion etc. Such an FRP stiffener can be provided, for example, as a structure shown in FIG. 15, wherein a stiffener 107 having an I-shaped cross section is provided on one skin of a sandwich panel including FRP skins 105a and 105b and a core 106. Further, a stiffener 108 having a C-shaped cross section can be employed as shown in FIG. 16. Furthermore, as shown in FIG. 17, a stiffener also can be formed by a hat-shaped FRP member 109, and it is possible that a core 109a is disposed in the member 109 to form a stiffener substantially having a sandwich structure or that such a core is not disposed to form a hollow stiffener.

Figure 18:
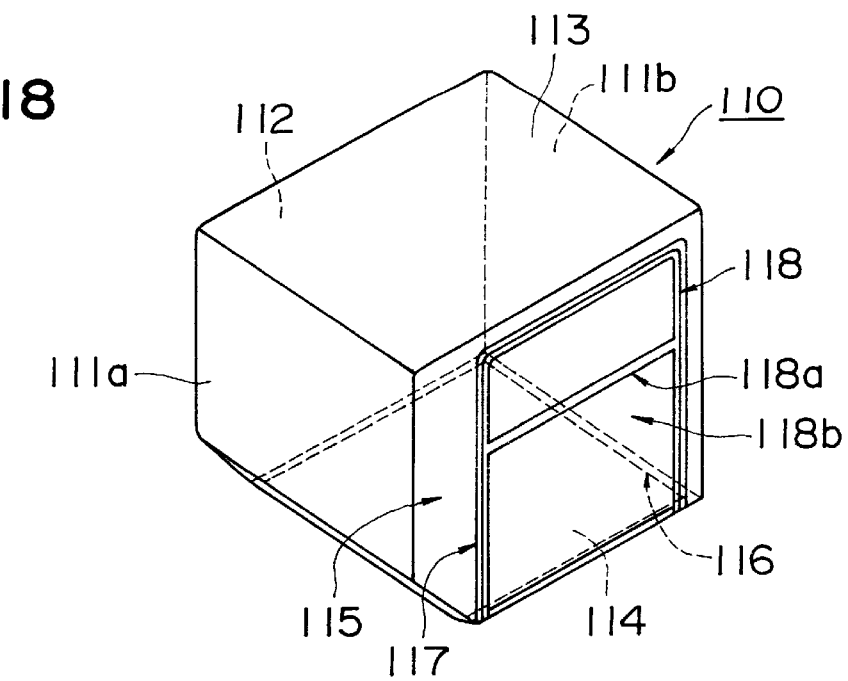
FIG. 18 is a perspective view of a cargo container according to a further embodiment of the present invention.

FIG. 18 is a perspective view of a container according to a further embodiment of the present invention. The container according to this embodiment is suitable particularly as an air cargo container.

In a container 110 according to this embodiment, a main portion of each wall is formed from a single FRP plate. The container 110 has both side walls 111a and 111b, a rear wall 112, a roof wall 113, floor wall 114 and a front wall 115 forming a portion other than a door. Label 116 indicates an aluminum-alloy bottom frame. An aluminum-alloy frame 117 for attachment of a door is connected to the front wall 115 by rivets, and door 118 is attached to the frame 117. The door 118 is formed by attaching an FRP door plate 118b to an aluminum-alloy door frame 118a by rivets.

Figure 19:
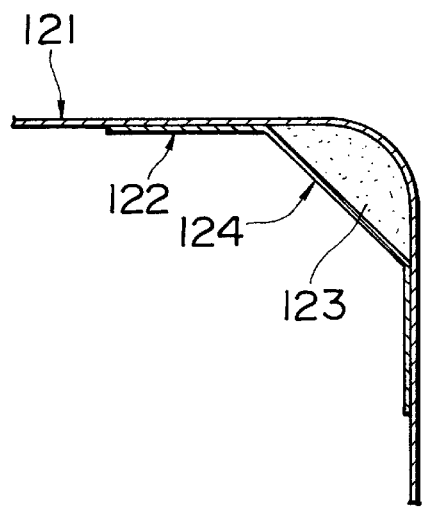
FIG. 19 is an enlarged, partial, vertical sectional view of a corner portion between panels of the container shown in FIG. 18.

FIG. 19 is a schematic vertical sectional view of a corner portion which is a connecting portion between the a roof wall 113 and a side wall 111a or 111b or a rear wall 112. In FIG. 19, label 121 indicates a single FRP plate integrally formed so as to extend over two walls. An FRP skin 122 is provided inside of the corner portion, and a stiffener 124 having a sandwich structure is formed by disposing a core 123 between the FRP plate 121 and the skin 122. This stiffener 124 provided on the corner may be formed as a stiffener which does not have a core 123 and has a hollow section structure.

Figure 20:
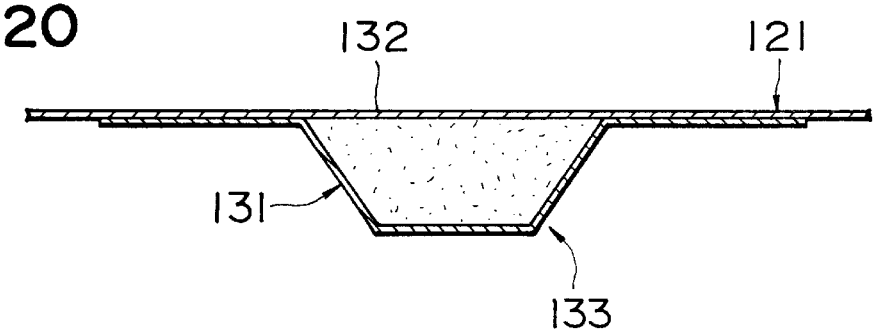
FIG. 20 is an enlarged vertical sectional view of a sandwich panel portion provided partially on a panel of the container shown in FIG. 18.

FIG. 20 shows a structure wherein a stiffener having a sandwich structure is formed partially on each wall. An FRP skin 131 is provided on the outer surface of the FRP plate 121 (as the case may be, on the inner surface), and a stiffener 133 having a sandwich structure is formed by disposing a core 132 between the FRP plate 121 and the skin 131. This stiffener 133 also may be formed as a stiffener which does not have a core 132 and has a hollow section structure.

The core and skin of these stiffeners 124 and 133 may be connected to the FRP plate 121 by an adhesive after forming of the FRP plate 121, and they may be formed simultaneously with forming of the FRP plate 121.

In such an air cargo container 110, a great lightening is possible as compared with a conventional aluminum-alloy air cargo container. For example, in a structure wherein the integrally formed panel is formed as a CFRP (carbon fiber reinforced plastic) panel using carbon fibers as reinforcing fibers, the door plate is formed from CFRP, the floor wall, the bottom frame and the door frame are formed from an aluminum-alloy, and these parts are connected by aluminum-alloy rivets, the rate for lightening reaches about 30%, and in a structure wherein the floor wall, the bottom frame and the door frame are also formed from CFRP, the rate for lightening reaches about 50%. Therefore, as compared with a conventional aluminum-alloy container having a weight of about 90 kg, the weight can be reduced at least by about 20–30 kg. Further, the number of parts for constituting a similar container can be reduced down to about 25 which is about a half of that in a conventional container, the number of rivets also can be reduced down to about 200 which is less than a half of that in a conventional container, and the time required for the fabrication and production thereof can be greatly reduced down to about ⅔ of that for a conventional container.

Further, because necessary strength and rigidity as the whole of the container can be easily ensured by providing sandwich-structure stiffeners or hollow stiffeners on the corner portions between the respective walls or on a part of each wall, not only the container can be formed frameless but also thinning of a single FRP plate portion of each wall becomes possible, and therefore, the rate for lightening can be further improved.

As explained hereinabove, in the present invention, the following excellent advantages can be obtained.

A) Since an FRP thin plate or a sandwich panel including FRP skins and a core is used, the container is light as well as has a high strength, and economical running of a ship or a vehicle becomes possible. Further, because at least two walls are integrally formed, further high strength and rigidity can be ensured.

B) By including a panel having a sandwich structure as a structural member of the container, necessary strength and rigidity required for the whole of the container can be easily ensured, not only it can be formed frameless but also a further thinning of a plate portion becomes possible, and the rate for lightening can be further improved.

C) Because at least two walls are integrally formed, the time and cost required for fabrication and production of the container can be greatly reduced.

D) In a case where carbon fibers are used, the impact resistance also can be increased except the strength and rigidity.

E) By using a material excellent in heat insulating particularly as a core of a wall having a sandwich structure, a cargo container light and having excellent freezing, refrigerating, cold insulating and heat insulating performances can be realized.

Industrial Applications of the Invention

The cargo container according to the present invention is light and sufficient strength and rigidity required for containers, and the time and cost required for fabrication and production thereof can be greatly reduced. Further, the cargo container constituted using a sandwich panel including a core and FRP skins has excellent freezing, refrigerating, cold insulating and heat insulating performances. Therefore, the container is useful particularly as a marine, truck or train cargo container.

We claim:

1. A cargo container comprising a plurality of walls, including a floor wall, a roof wall, a rear wall and a side wall to form said container, at least one of said walls having a sandwich panel comprising a core and fiber reinforced plastic skins as a main rigidity-maintaining member, wherein said fiber reinforced plastic skins are connected by a web, wherein at least two of said walls which are adjacent to each other have a continuous reinforcing fiber substrate across them and are integrally molded together using a single fiber reinforced plastic panel and wherein said container further comprises at least one fiber reinforced plastic girder.

2. The cargo container according to claim 1, wherein said at least two walls are a floor wall and said side wall.

3. The cargo container according to claim 1, wherein said at least two walls are a roof wall and said side wall.

4. The cargo container according to claim 1, wherein said at least two walls are a floor wall, a side wall and said rear wall.

5. The cargo container according to claim 1, wherein said at least two walls are a roof wall, a side wall and said rear wall.

6. The cargo container according to claim 1, wherein said at least two walls are a floor wall, a side wall, said rear wall and said roof wall.

7. The cargo container according to claim 1, wherein at least a part of said at least two walls has a sandwich structure including a core and fiber reinforced plastic skins.

8. The cargo container according to claim 1, wherein said core comprises a synthetic resin foam.

9. The cargo container according to claim 1, wherein a beam is provided on a back surface of said floor wall.

10. The cargo container according to claim 9, wherein said beam has a sandwich structure including a core and a fiber reinforced plastic skin.

11. A cargo container comprising a plurality of walls, including a floor wall, a roof wall, a rear wall, and a side wall to form said container, at least one of said walls having a sandwich panel comprising a core and fiber reinforced plastic skins as a main rigidity-maintaining member, wherein said fiber reinforced plastic skins are connected by a web, wherein at least two of said walls which are adjacent to each other have a continuous reinforcing fiber substrate across them and are integrally molded together using a single fiber reinforced plastic panel, and wherein a beam having a sandwich structure including a core and a fiber reinforced plastic skin is provided on a back surface of the floor wall.

* * * * *

UNITED STATES PATENT AND TRADEMARK OFFICE
CERTIFICATE OF CORRECTION

PATENT NO. : 5,979,684
DATED : November 9, 1999
INVENTOR(S) : Hiroshi Ohnishi, Nobuhiko Shimizu, Masayoshi Yamagiwa It is certified that error appears in the above-identified patent and that said Letters Patent is hereby corrected as shown below:

In Column 10 at line 32 please change "6,5" to -- 6 -- .

In Column 14 at line 2 before "floor" please change "a" to -- said-- ;

at line 4 before "roof" please change "a" to -- said-- ;

at line 6, please change "a", both occurrences, to -- said-- ;

at line 9, please change "a", both occurrences, to -- said-- ;

at line 12, please change "a", both occurrences, to -- said-- ;

Signed and Sealed this

Thirtieth Day of January, 2001

Attest:

Q. TODD DICKINSON

Attesting Officer

Director of Patents and Trademarks